USOO5592221A

United States Patent [19]
Mielke

[11] Patent Number: 5,592,221
[45] Date of Patent: Jan. 7, 1997

[54] PHOTOGRAPHIC CAMERA WITH ROTATABLE FILTER ASSEMBLY HAVING INTERCHANGEABLE FILTER DISKS AND CHARGE-COUPLED SURFACE SENSOR

[75] Inventor: Bodo Mielke, Fümmelse, Germany

[73] Assignee: Rollei Fototechnic GmbH, Braunschweig, Germany

[21] Appl. No.: 491,218

[22] Filed: Jun. 16, 1995

[30] Foreign Application Priority Data

Jul. 5, 1994 [DE] Germany ............ 44 23 425.2

[51] Int. Cl.[6] .................................................. H04N 9/083
[52] U.S. Cl. .................... 348/270; 348/271; 348/373; 396/275
[58] Field of Search ................................ 348/270, 271, 348/273, 276, 277, 279, 282, 373, 375, 376, 374; 358/42, 909.1; 354/482, 100; H04N 9/04, 9/083

[56] References Cited

U.S. PATENT DOCUMENTS

| 4,774,539 | 9/1988 | Suda .......................................... 354/482 |
| 4,855,837 | 8/1989 | Tanimoto . | |
| 5,113,254 | 5/1992 | Kanno ....................................... 348/270 |
| 5,153,717 | 10/1992 | Nitta . | |

FOREIGN PATENT DOCUMENTS

| 3624506A1 | 7/1986 | Germany . |
| 4423425.2 | 1/1995 | Germany . |
| 58-10985 | 1/1983 | Japan . |
| WO94/05115 | 8/1992 | WIPO . |

OTHER PUBLICATIONS

Der Kamera–Scanner, Rollei Digital Scanpack, Rollei Fototechnic, 6 pages.
Are Trends Electronic, the British Journal of Photography, Jan. 14, 1993, pp. 20–21.

*Primary Examiner*—Sherrie Hsia
*Attorney, Agent, or Firm*—Whitham, Curtis, Whitham & McGinn

[57] ABSTRACT

A photographic camera (1) includes a back part (8) attachment that houses a charge-coupled surface sensor (9) and an associated filter system (11 and 13–17). The filter system includes a plurality of filters (13–16) positioned on a carrier (11). A motor (20) rotates the carrier (11) about rotational axis (12) such that individual filters (13–16) or cover disk (17) are positioned in front of the charge-coupled surface sensor (9). When the back part (8) attachment is mounted on the camera, the charge-coupled surface sensor (9) and one of the filters (13–16) lie in the beam bath from lens (3). Preferably, the lens (3) is interchangeable. Preferably, the individual filters (13–16) of the filter system are selected to break down incident light into primary colors (e.g., red, green, blue, and yellow). The cover disk (17) protects the charge-coupled surface sensor (9) when the back part (8) attachment is removed from the camera body (1).

20 Claims, 2 Drawing Sheets

PHOTOGRAPHIC CAMERA WITH ROTATABLE FILTER ASSEMBLY HAVING INTERCHANGEABLE FILTER DISKS AND CHARGE-COUPLED SURFACE SENSOR

BACKGROUND OF THE INVENTION

1. Field of the Invention

The invention relates to a CCD surface sensor with a filter system associated therewith, said system breaking down light entering through interchangeable filter disks into its primary colors.

2. Description of the Prior Art

It is known that a CCD surface sensor, which can have for example 2000×2000 pixels, can be combined with an interchangeable lens to produce an image in a computer. Scanning is then no longer required. To reproduce the resultant image in color, a filter system is used, designed as a rotatable filter disk and disposed in a folding camera between the lens and the CCD surface sensor. On the other hand, if a fixed camera body is used, the filter disk must be located in front of the lens.

SUMMARY OF THE INVENTION

The goal of the invention is to improve on the known filter system.

This goal is achieved according to the invention by the following features:

a) A back part (8) that receives CCD surface sensor (9) as well as filter system (11–17), said back part being mountable in place of a film cassette or an interchangeable magazine with a back part window (10) on the rear image field opening (4) of a fixed camera body (1), said body having a preferably interchangeable lens (3) in its front side;

b) Filter system (11–17) has a filter disk carrier (11) rotatable around a central rotational axis (12) on which carrier filter disks (13–16) are mounted, circumferentially staggered and rotationally symmetrically arranged with respect to rotational axis (12);

c) CCD surface sensor (9) is permanently mounted in such fashion and surrounded in such fashion by filter disk carrier (11) that by rotating filter disk carrier (11) individual filter disks (13–16) emerge in succession from back part window (10) and are positionable in front of CCD surface sensor (9) in such fashion that when back part (8) is mounted, the filter disk (13) that is located in the working position and the CCD surface sensor (9) lie in the beam path of lens (3).

The filter system designed according the invention can thus be used together with the CCD surface sensor associated therewith, especially in existing camera systems, namely instead of an otherwise conventional interchangeable back part for a film cassette or an interchangeable magazine. The line sensors previously used, which require a scanning process, can be eliminated, thus making flash technique also possible once again. By integrating the CCD surface sensor and the filter system associated therewith into an interchangeable back part, a fixed camera body can be used; the limitation to a folding camera is eliminated.

In order to break down the incident light into its three primary colors, it is advantageous for the filter disk carrier to contain one white, one green, one red, and one blue filter disk. In addition, one circumferential segment of the filter disk carrier can be replaced by a covered disk, which is rotated in front of the CCD surface sensor before the back part of the Camera body is removed, thus covering the sensor in a dust-tight manner. As a result, a simple seal against contamination is provided.

The filter disk carrier can be drivable by means of a motor likewise located in the back part. This results in a simple and compact form of drive.

The CCD surface sensor projects for a short distance above the image field plane, defined by the image field opening of the camera body and/or the back part window. This penetration depth reflects the height in front of the CCD Surface sensor, namely the clearance for the bonding wires and the cower glass thickness, with this height amounting to several millimeters and having to penetrate correspondingly deeply into the image field opening of the camera body. This is possible without difficulty because of the design selected according to the invention. The required penetration depth is further increased by the thickness of the filter disks when color decomposition is required. It is especially advantageous in this regard for a maximum possible distance to be provided between the filter disk and the CCD surface sensor, so that imaging errors caused by duet particles can be avoided. Nevertheless, the design according to the invention results in a compact structure.

BRIEF DESCRIPTION OF THE DRAWINGS

In the drawing, one embodiment of the invention is shown as an example.

DESCRIPTION OF THE PREFERRED EMBODIMENTS

Figure 1:
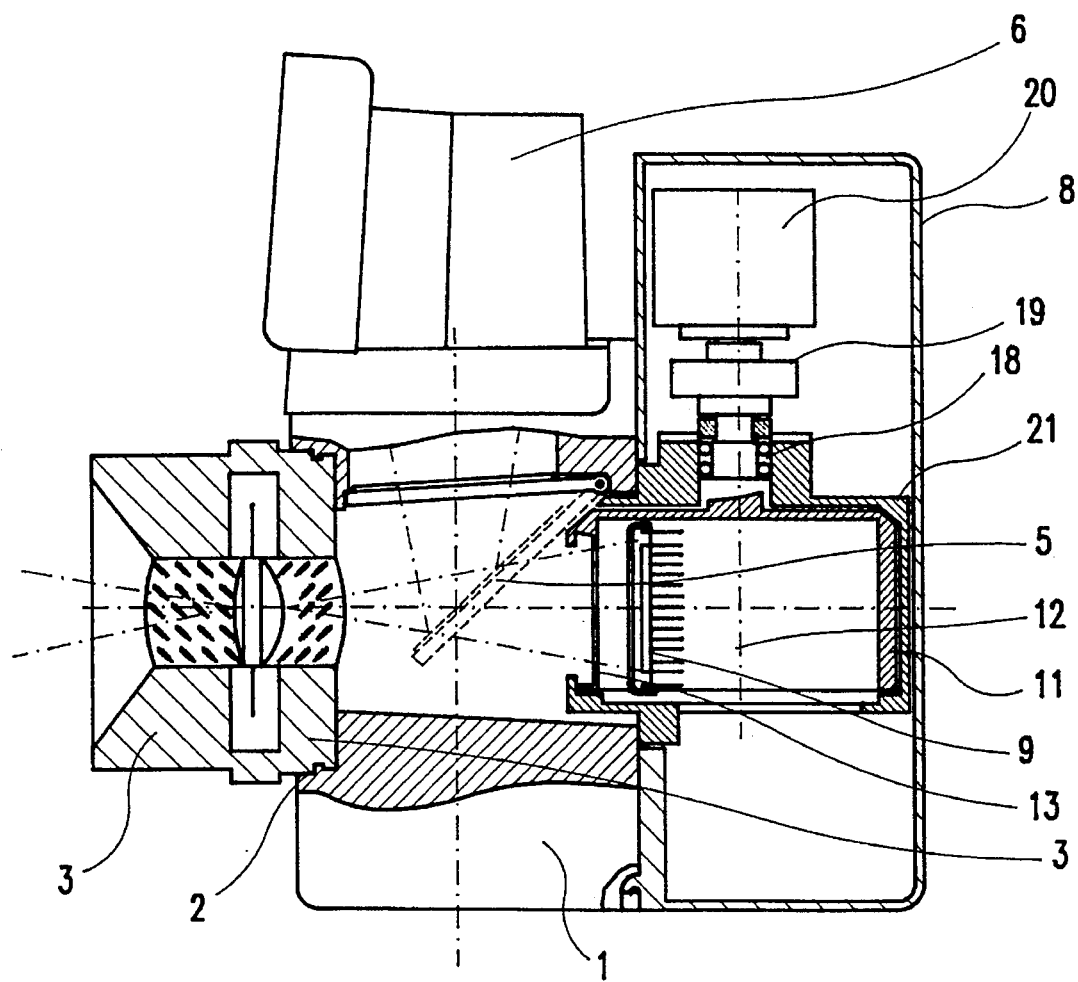
FIG. 1 shows a vertical lengthwise section through a digital camera with a mounted back part according to the invention.
Figure 2:
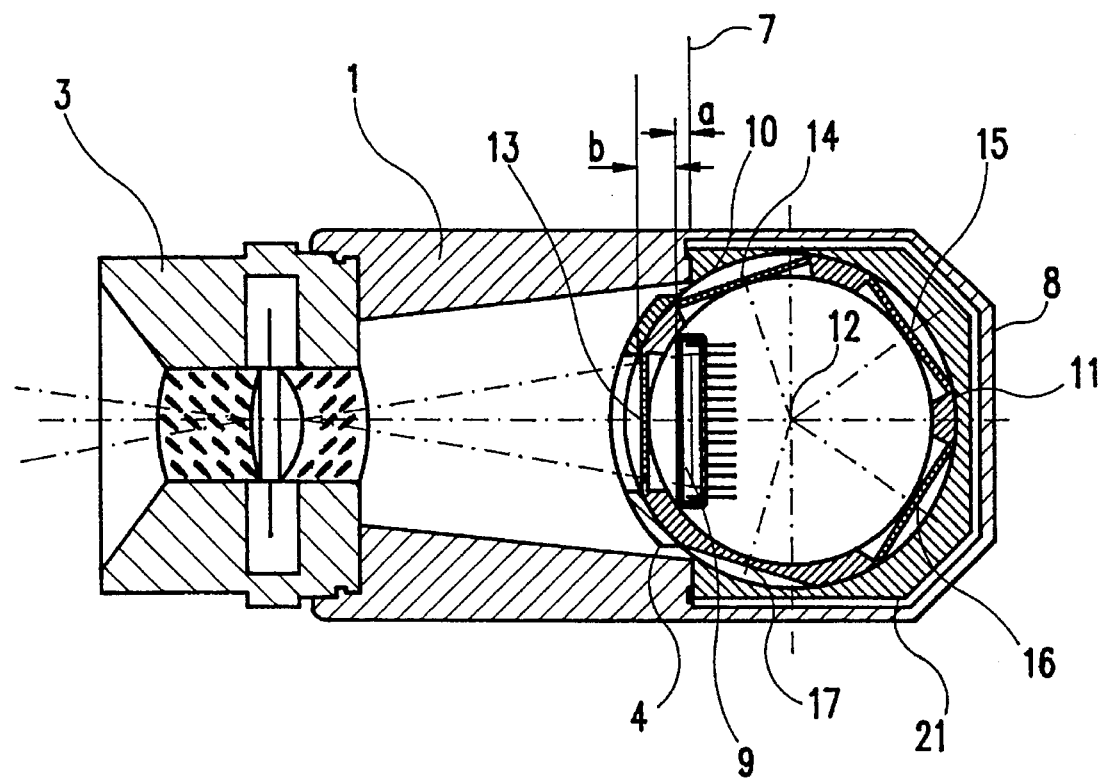
FIG. 2 is a horizontal section through the drawing in FIG. 1.

The embodiment shown shows a digital camera with a fixed camera body 1, having in its front side for example a bayonet mount 2 for an interchangeable lens 3 and in its back part an image field opening 4 lying on the beam path of lens 3.

A pivotable camera mirror 5 is located in camera body 1, said mirror being capable of being pivoted into the beam path (position shown by dashed lines) in order to deflect the beams entering through lens 3 into a folding focusing hood 6.

Camera body 1 is designed so that an interchangeable back part for a film cassette or an interchangeable magazine is connectable to its rear image field opening 4. The mounting surface of camera body 1 or that of the interchangeable back part thus forms image field plane 7.

Instead of a known interchangeable back part, a newly designed back part 8 is provided according to the invention, said part together with camera body 1 known of itself forming a digital camera with the following features:

A CCD surface sensor 9 is permanently mounted inside back part 8, said sensor projecting for a distance a from a back part window 10 flush with image field opening 4, thus projecting for a distance a above image field plane 7 and/or penetrating by this amount into image field opening 4 of camera body 1.

A filter disk carrier 11 is mounted around CCD surface sensor 9, said carrier being rotatable around a rotational axis 12 that is perpendicular with respect to FIG. 1, has an approximately polygonal cross section, and is equipped with circumferentially staggered and rotationally symmetrically (with respect to rotational axis 12) mounted filter disks 13, 14, 15, 16 and a cover disk 17. By rotating filter disk carrier 11, individual filter disks 13–16 emerge in succession from back part window 10 and are positioned in front of CCD surface sensor 9 in such fashion that when back part 8 is mounted, filter disk 13 and CCD surface sensor 9 located in the working position lie on the beam path of lens 3. Then filter disk 13 located in the working position has a clearance b from CCD surface sensor 9 and also penetrates for a distance a+b into image field opening 4 of camera body 1.

In the embodiment shown, a circumferential segment of filter disk carrier 11 is formed by a Cover disk 17 that is rotated into a covering position to protect CCD surface sensor 9 before back part 8 is removed from camera body 1.

FIG. 1 shows that filter disk carrier 11 is mounted unsupported in a bearing 18 and is drivable through a coupling 19 by a motor 20. Filter disk carrier 11 then rotates within a filter housing 21 that largely surrounds it.

Using a back part 8 designed according to the invention, a digital camera can be designed in which the use of a surface sensor eliminates a scanning process and makes flash possible once again. The light entering through lens 3 is broken down by the filter disks into its three primary colors; the existing contours in the image window area are taken into account.

Having thus described my invention, what I claim as new and desire to secure by Letters Patent is as follows:

1. A photographic camera, comprising:

a camera body having first and second sides;

a lens positioned on said first side of said camera body;

a back part selectively connectable to said second side of said camera body, said back part having a back part window positioned in a rear image field opening of said camera body;

a filter system positioned within said back part having a filter disk carrier rotatable around a central rotational axis, on said filter disk carrier a plurality of filter disks are disposed, staggered circumferentially and rotationally symmetrically with respect to said central rotational axis; each filter disk being disposed in a plane parallel to said central rotational axis; and a charge-coupled device surface sensor mounted in said back part at a position where said charge-coupled device surface sensor is aligned with said lens, said rear image field opening and said back part window and is surrounded by said filter disk carrier whereby rotating said filter disk carrier causes individual filter disks to emerge in succession in front of said charge-coupled device surface sensor.

2. Photographic camera according to claim 1 wherein said filter disk carrier comprises one white, one green, one red, and one blue filter disk.

3. Photographic camera according to claim 1 further comprising a cover disk positioned on said filter disk carrier, said cover disk being made of a material which will block light transmission to said charge-coupled device surface sensor.

4. Photographic camera according to claim 1 further comprising a motor positioned in said back part, said motor being operably connected to rotate said filter disk carrier.

5. Photographic camera according to claim 1 wherein said back part window lies approximately in an image field plane of said rear image field opening of said camera body.

6. Photographic camera according to claim 1 wherein it filter disk of said plurality of filter disks, when in a working position, has a clearance from said charge-coupled device surface sensor and is recessed correspondingly deeply into said rear image field opening of said camera body.

7. Photographic camera according to claim 5 wherein said charge-coupled device surface sensor projects a short distance above said image field plane.

8. Photographic camera according to claim 2 wherein one circumferential segment of said filter disk carrier is formed by a cover disk.

9. Photographic camera according to claim 2 further comprising a motor positioned in said back part, said motor being operably connected to rotate said filter disk carrier.

10. Photographic camera according to claim 3 further comprising a motor positioned in said back part, said motor being operably connected to rotate said filter disk carrier.

11. Photographic camera according to claim 6 wherein said charge-coupled device surface sensor projects a short distance above an image field plane of said rear image field opening.

12. A filter system for a photographic device, said filter system comprising:

a back part connectable to said photographic device, said back part including an opening positioned to allow images from said photographic device to be transmitted into said back part;

a filter assembly, rotatably mounted within said back part, including a plurality of filters;

rotation means for controllably rotating said filter assembly; and image receiving means mounted within said back part behind a filter of said plurality of filters which is positioned within said opening in said back part.

13. A filter systems as in claim 12, wherein said back part is removable from said photographic device.

14. A filter system as in claim 12, wherein said image receiving means comprises a charge-coupled device array.

15. A filter system as in claim 12, wherein said rotation means comprises a power-driven motor.

16. A filter system as in claim 12, wherein said filter assembly comprises:

a frame which rotates about an axis within said back part, wherein said plurality of filters are substantially parallel with said axis.

17. A filter system as in claim 12 wherein one of said plurality of filters is a cover filter which covers said opening when said filter assembly is rotated to place said cover filter in said opening.

18. A filter system as in claim 16, wherein said image receiving means is mounted within a circumference defined by said frame.

19. The filter system of claim 12 wherein said filter assembly includes a cover disk which blocks images from being transmitted to said image receiving means.

20. The photographic camera of claim 1 wherein said lens positioned on said first side of said camera body is interchangeable.

* * * * *